United States Patent [19]

Ivey

[11] Patent Number: 4,901,376
[45] Date of Patent: Feb. 20, 1990

[54] BATHROOM VENTILATOR HOUSING
[75] Inventor: Charles W. Ivey, Hope Mills, N.C.
[73] Assignee: Fasco Industries, Inc., Lake Forest, Ill.
[21] Appl. No.: 229,475
[22] Filed: Aug. 8, 1988
[51] Int. Cl.⁴ .......................... H02G 3/14; F24F 7/00
[52] U.S. Cl. ..................................... 4/213; 174/65 R; 220/3.8; 220/353; 98/42.07
[58] Field of Search .................. 4/209 R, 213, 209 FF, 4/210–218; 174/65 R; 220/3.8, 352, 353, 327, 266, 3.2, 3.7, 3.94; 98/42.07, 42.08, 42.09, 42.1; 285/128, 129; 361/356, 358, 359, 383, 384

[56] References Cited
U.S. PATENT DOCUMENTS

| | | | |
|---|---|---|---|
| 642,521 | 1/1900 | Greenfield | 220/3.94 |
| 892,220 | 6/1908 | Burns | 220/3.8 |
| 2,349,668 | 5/1944 | Marker et al. | 98/42.08 |
| 2,780,981 | 2/1957 | Miller | 98/42.08 |
| 2,800,849 | 7/1957 | Spear | 98/42.08 |
| 3,483,309 | 12/1969 | Kerseg et al. | 285/128 |

FOREIGN PATENT DOCUMENTS
0658728  3/1963  Canada .................. 174/65 R

Primary Examiner—Henry J. Recla
Assistant Examiner—J. Casimer Jacyna
Attorney, Agent, or Firm—Shlesinger, Fitzsimmons & Shlesinger

[57] ABSTRACT

The housing has therein two wire inlet/outlet openings overlapped by opposite ends of a removable, generally L-shaped knockout cover, which has in one end an access opening registering with one inlet/outlet opening, and in its opposite end a knockout plug which covers the other inlet/outlet opening, but which can be removed if both inlet/outlet openings are to be used. A wiring chamber is formed in the housing in communication with the inlet/outlet openings by a removable right-angular cover element which cooperates with the housing walls to form a chamber which is triangular in cross section.

12 Claims, 2 Drawing Sheets

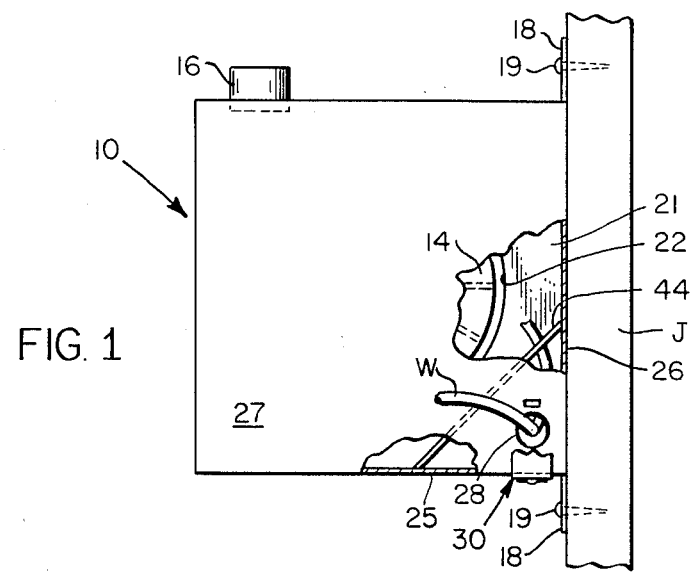
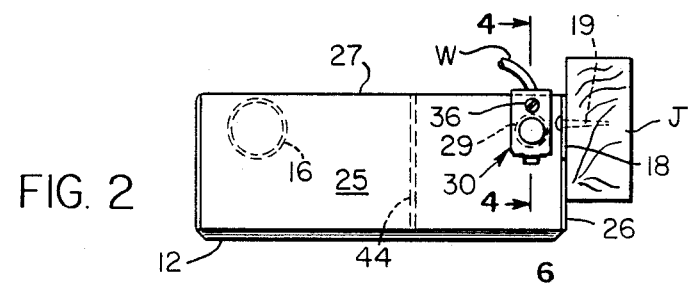
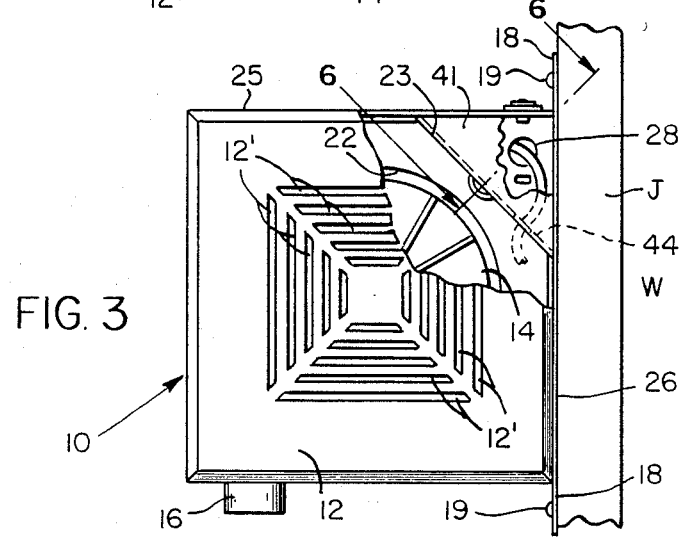

BATHROOM VENTILATOR HOUSING

BACKGROUND OF THE INVENTION

This invention relates to housings for bathroom ventilators or the like, and more particularly to an improved such housing having novel knockout hole and wiring compartment covers therefor.

The Underwriter's Laboratory, Inc. sets industry guide lines for bathroom ventilator safety requirements. Among one such requirement is that the area surrounding a knockout portion of a ventilator housing—i.e., that portion of the housing which is knocked out to provide an ingress/egress hole or holes for the electrical wiring of the ventilator—must have a minimum thickness of 0.032". The National Electrical Code requires also that any unused knockout hole in the housing must be plugged.

The knockout portions of housings of the type described are utilized, of course, to expedite the installation of the associated electrical appliance. U.S. Pat. No. 3,981,069, for example, discloses a knockout hole cover or support for a range-hood of the canopy type. The hole cover or support is adapted to be releasably secured over a knockout hole in the housing by means of a screw. The support itself has therein a hole to which the incoming power cable is mechanically coupled or clamped, after which the support, which is in the form of a disc, is secured over a hole that has been formed in the housing by punching out a knockout portion of the housing. The disadvantage of this construction, however, is that it supports or consists of only one hole for accommodating one incoming cable, and does not cover any unused holes.

The Underwriter's Laboratory and the National Electrical Code also require that all field wiring connections be contained within an outlet box, and that the outlet box be provided with a cover which can be removed for inspection of the wiring connections between the incoming power and the leads from the associated appliance, for example the motor of a ventilator fan.

It is an object of this invention, therefore, to provide for an electrical appliance an improved housing of the type described having a novel knockout hole support or cover which is capable of functioning both as a wire support and as a cover for unused knockout holes in the housing.

Still another object of this invention is to provide an improved housing of the type described which has incorporated therein an inexpensive, removable wiring compartment cover which registers with selected portions of the housing walls to form therewith an outlet box or wiring compartment in the housing.

Other objects of the invention will be apparent hereinafter from the specification and from the recital of the appended claims, particularly when read in conjunction with the accompanying drawings.

SUMMARY OF THE INVENTION

The housing is generally rectangular in configuration and adjacent one corner thereof has in each of two of its intersecting walls a knockout hole or opening for accommodating power supply wires. A reversible, generally L-shaped knockout hole cover is removably secured to said housing with a hole in one leg thereof registering with one of said knockout holes, and with a knockout plug in its other leg overlying and covering the other knockout hole in the housing.

Power supply wire are insertable through the registering openings in the housing and the L-shaped knockout cover, respectively, and are disposed to be connected in one corner of the housing to the leads of an electric motor. These wiring connections are located in a wiring compartment which is triangular in cross section, and which is defined by three of the intersecting walls of the housing, and a removable compartment cover. This cover comprises of a flat, rectangular section which extends diagonally between a pair of said intersecting housing walls, and which is engaged at its inner edge with a third wall of the housing. A flat, triangular section of the cover projects at right angles from the outer edge of rectangular cover section, and into the intersection formed by said pair of housing walls.

THE DRAWINGS

FIG. 1 is a fragmentary plan view of a residential bathroom ventilator housing made according to one embodiment of this invention, the housing being shown mounted on one side of a ceiling joist for a bathroom, or the like, with portions of the housing being broken away and shown in section, and with part of an associated knockout cover or support being shown fragmentarily;

FIG. 2 is a front elevational view of the housing shown in FIG. 1;

FIG. 3 is a bottom plan view of the housing with a portion of its grill broken away to show a wiring compartment cover which is removably mounted in the housing, a portion of this cover also being cut away;

PREFERRED EMBODIMENTS OF THE INVENTION

Figure 4:
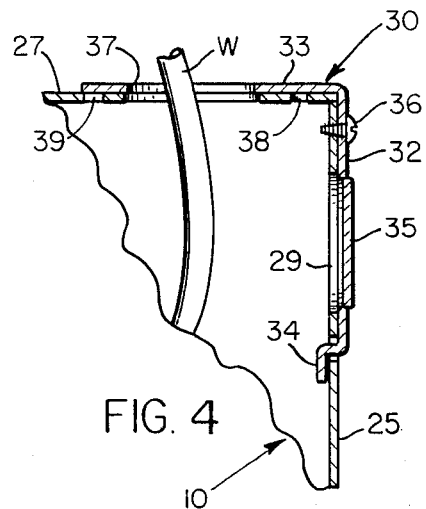
FIG. 4 is an enlarged, fragmentary sectional view taken generally along the line 4—4 in FIG. 2 looking in the direction of the arrows, and illustrating one of two different positions in which the knockout support may be secured to the housing adjacent one corner thereof.
Figure 5:
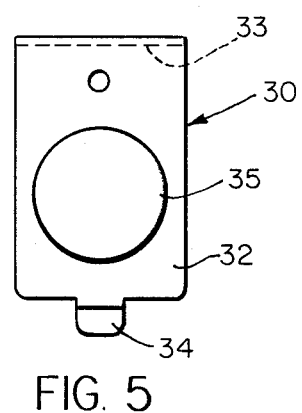
FIG. 5 is a detail view of this knockout support as seen when looking at the left side of the housing as shown in FIG. 4, the support being shown as it appears before being secured to the housing.

Referring now to the drawings by numerals of reference, 10 denotes generally a metal ventilator housing, which is rectangular in cross section, and which has a large, rectangular grille 12 secured in a conventional manner over its lower, open end. Grille 12, which may be of any conventional design, has therein the usual array of slots 12' which communicate with the interior of the housing so that, when the ventilator or exhaust fan 14 in the housing is rotated by its associated motor (not illustrated), air from the room will be drawn into the housing through the grille 12 and will be exhausted from the housing through a discharge duct 16.

At one side thereof (the right side as shown in FIG. 1) housing 10 also has projecting from opposed sidewalls thereof a pair of integral brackets 18 by means of which the housing can be mounted by screws 19 on the side of a ceiling joist J, or the like.

Figure 6:
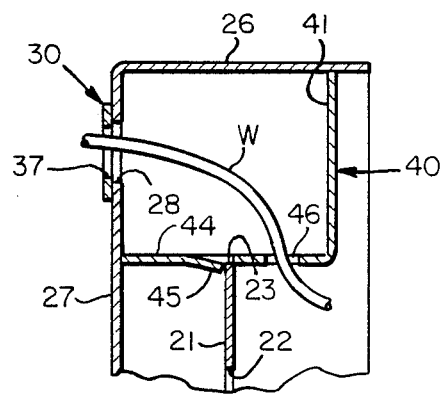
FIG. 6 is an enlarged, fragmentary sectional view taken generally along the line 6—6 in FIG. 3 looking in the direction of the arrows.

Secured in housing 10 approximately midway between its upper and lower surfaces, and extending transversely across the center of the housing, is a rigid, rectangular partition 21. Partition 21 has in its center a large, circular opening 22 in which the fan 14 is mounted for coaxial rotation by conventional means which form no part of this invention. Partition 21 also has one corner portion thereof removed, thereby forming on the partition an inclined edge 23, (FIGS. 3 and 6) which extends diagonally between a pair of the intersecting sidewalls 25 and 26 of housing 10.

Adjacent the corner thereof formed by its intersection with housing sidewalls 25 and 26, the plane upper or top wall 27 of housing 10 has therein a circular wire inlet/outlet opening 28. A similar inlet/outlet opening 29 (FIG. 4) is formed in the housing wall 25 adjacent its intersection with housing wall 27.

Numeral 30 denotes generally an L-shaped knockout support or cover element having a first leg section 32 overlying the housing inlet/outlet opening 29, and a second leg section 33, which extends at right angles from leg section 32 to overlie the opening 28 in the housing wall 27. Integral with and projecting centrally from the lower edge of leg section 32 is a dog-legged shaped tang 34, which projects releasably through a registering opening formed in the housing wall 25 beneath the circular opening 29. Intermediate its ends the leg section 32 also has formed therein, and centrally thereof, a circular knockout plug 35, which overlies and closes the opening 29 in the housing wall 25 when the support 30 is secured by screw 36 to the housing 10 as shown in FIGS. 2 and 4. Also at such time another circular opening 37 in the leg section 33 of the support 30 registers with the opening 28 in the housing wall 27, so that the wires W for supplying power to the motor in the housing can be inserted through the registering openings 37 and 28 for connection in a conventional manner to the fan drive motor.

In addition to the circular opening 28 the housing wall 27 has therein a smaller, circular opening 38, which, as noted hereinafter, can be utilized to accommodate the shank of the screw 36; and beneath the opening 28 the wall 27 has therein still another opening 39 for accommodating the tang 34 of the support 30, when the latter is disposed in a second position as noted hereinafter.

As previously noted, when the wires W are connected to the motor within the housing 10, it is essential that the connection be enclosed in an outlet box having a removable cover. For purposes of this invention the outlet box, which is employed to enclose the connection between the wire W and the motor leads, is formed in part by the intersecting housing walls 25, 26 and 27, and by the legs of a removable cover element, which is denoted generally at 40 in the drawings.

Figure 7:
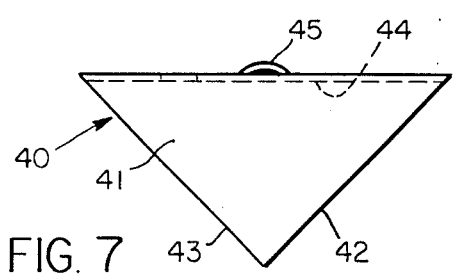
FIG. 7 is a front elevational detail view of the wiring compartment cover which is removably mounted in the housing, the cover being shown as it appears before being mounted in the housing.
Figure 8:
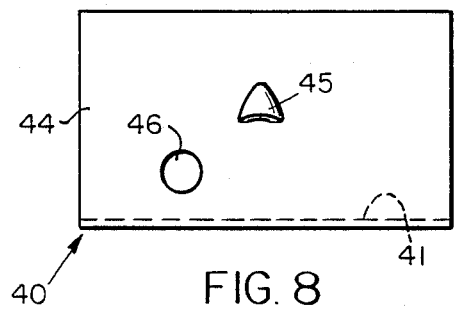
FIG. 8 is a plan view of the cover as shown in FIG. 7.

As shown more clearly in FIGS. 7 and 8, the cover element 40 comprises two, planar sections 41 and 44 which intersect each other at right angles. Section 41, as shown in FIGS. 7 and 8, is triangular in configuration and has a pair of inclined edges 42 and 43 which intersect each other at right angles. The other section 44, however, is rectangular in configuration, and has struck up from the center thereof a small, arcuate detent or lip 45 having an open end which faces in the direction of the cover section 41. Section 44 also has therein a circular opening 46 which is located adjacent one of the corners where the sections 41 and 44 intersect.

In use, and while the grille 12 is removed, the leads from the ventilator motor (not illustrated) are fed through the opening 46 in the cover element 40, and are connected to the wire leads W from the power supply, which enter housing 10 through the registering openings 37 and 28 (FIG. 4). These connections, which of course also are insulated, are then positioned adjacent the intersection of the housing walls 25 and 26 by sliding the cover element 40 into the housing 10 in such manner that its rectangular section 44 passes or slides beneath the inclined edge 23 of the partition 21 until the inner edge of the cover section 44 engages the inside of the housing wall 27. At that time the detent 45 on the cover section 44 will have snapped beneath and beyond the inclined edge 23 of the partition 21, thereby causing the intersecting edges 42 and 43 on the cover section 41 to be held in coplanar engagement with the inside surfaces of the housing walls 25 and 26, respectively. As a consequence the electrical connections are enclosed in a chamber bound by the cover 40 and registering portions of the housing walls 25, 26 and 27.

In order to inspect the electrical connections, one need only to remover the grille 12, and then depress with a thumb or finger the cover section 44 sufficiently to enable its detent 45 to be slid beneath the inclined edge 23 of the partition 21, after which the cover element 40 can be withdrawn or slid out of the housing to expose the electrical connections. Thereafter the cover 40 may be reinserted simply by pushing it back into its position as shown in FIGS. 1–3 and 6.

The advantage of the knockout support 30 is that, when the housing is originally manufactured, the L-shaped support is adapted to be secured by the screw 36 in the position as shown in the drawings. This exposes opening 28, which is the wire inlet/outlet opening that is most frequently employed. However, should it be desired to utilize the other opening 29, it is possible to remove the screw 36, and to reverse the position of the support 30 so that the tab 34 will now be positioned in opening 39, and the screw 32 will be threaded into the opening 38 in the housing wall 27. This will cause the plug 35 now to be positioned over and to close the opening 28, while the opening 37 in the support 30 will now register with opening 29 to enable the power supply leads to be inserted or withdrawn through opening 29.

Furthermore, in the event that it is desired to utilize the apparatus in connection with so-called "pull through wiring", in which case it would be desirable to employ both the openings 28 and 29, one need only to knock out the plug 35 from support 30, thereby exposing both of the openings 28 and 29.

From the foregoing it will be apparent that the present invention provides extremely simple and inexpensive means for considerably enhancing the ease with which appliance housings of the type described can be mounted and wired. For example, the knockout support 30 operates to provide or support one knockout hole, while automatically sealing the other, unused hole. The support can be reversed, if desired, to open the previously sealed hole, and to seal the formerly open hole; or alternatively, the knockout plug can be removed to provide access to both openings 28 and 29.

As for the removable or snap-in outlet box cover 40, it will be readily apparent that the cover does not require the use of any separate, mechanical means for securing it releasably in the housing. By utilizing portions of the housing walls to create the outlet box, the cost of complying with the U.L. and the N.E.C. requirements is considerably reduced. Furthermore, this type of cover can be utilized without the use of any separate tools for inserting or withdrawing the cover.

While this invention has been illustrated and described in connection with ventilator housings, it will be apparent that it is capable of being employed with other types of appliance housings, and that this application is intended to cover any such modifications as may fall within the scope of one skilled in the art, or the appended claims.

I claim:

1. An enclosure for an electrical appliance, comprising
    a plurality of walls interconnected to each other to form a housing for an electrical appliance of the type having a plurality of wire leads disposed to be connected in the housing to power supply wires originating externally of the housing,
    a first one of said walls having therein a first wire inlet/outlet opening,
    a second one of said walls having therein a second wire inlet/outlet opening,
    a knockout hole cover element releasably secured in a first position on said housing with a first portion thereof overlying said first opening in said first wall, and with a second portion thereof overlying said second opening in said second wall,
    one of said portions of said cover element having therethrough a first access opening which registers with one of said inlet/outlet openings,
    the other portion of said cover element having formed thereon a knockout plug which overlies and covers the other of said inlet/outlet openings, and which can be knocked out of said cover element to form therein a second access openings when use of both said first and second inlet/outlet openings is desired, and
    means forming in said housing a wiring chamber communicating with said first and second wire inlet/outlet openings,
    said means comprising a second cover element removably mounted in said housing and extending transversely of the walls of said housing, whereby said chamber is formed in part by portions of said housing walls and in part by said second cover element.

2. An enclosure as defined in claim 1, wherein said housing is open at one end, and said second cover element is insertable into and withdrawable from said housing through said open end thereof.

3. An enclosure as defined in claim 2 wherein a first portion of said second cover element is inclined to and extends transversely between said first and second housing walls, and a second portion thereof overlies and closes part of said open end of said housing at one end of said chamber.

4. An enclosure as defined in claim 3, wherein the opposite end of said chamber is closed by a third one of said housing walls.

5. An enclosure as defined in claim 4, including
    a partition formed in said housing intermediate the ends thereof, and
    means on said second cover element releasably engagable with said partition to retain said second cover element releasably in said housing.

6. An enclosure for an electrical appliance, comprising
    a housing open at one end, closed at its opposite end, and having intermediate its ends a first wire inlet/outlet opening for accommodating wire leads from a power supply located externally of the housing,
    a first cover element removably mounted in said housing and cooperating with portions of said housing to form therein a wiring chamber extending between opposite ends of said housing and communicating with said inlet/outlet opening,
    said first cover element being insertable into and withdrawable from said housing through said open end thereof,
    detent means on said first cover element releasably engageable with said housing upon the insertion of said element into the housing releasably to retain said first cover element in a closed position in said housing,
    said housing having therein a second wire inlet/outlet opening spaced from said first opening,
    a second cover element releasably secured in a first position on said housing with a first portion thereof overlying said first inlet/outlet opening and with a second portion thereof overlying said second inlet/outlet opening, and
    one of said portions of said second cover element having therethrough a first access opening registering with one of said wire inlet/outlet openings, and the other portion of said second cover element having formed thereon a knockout plug which overlies and covers the other of said wire inlet/outlet openings, and which can be knocked out of said second cover element, if desired.

7. An enclosure as defined in claim 6, including means for selectively securing said second cover element in a second position on said housing, and wherein said access opening registers with said other of said wire inlet/outlet openings, and said plug registers with and covers said one wire inlet/outlet opening.

8. An enclosure as defined in claim 9, wherein
    said housing includes a first pair of intersecting walls each of which contains one of said wire inlet/outlet openings, and a third wall intersecting said first pair of walls and forming the closed end of said housing and said chamber, and
    said first cover element has a first portion thereof engaged at one end with said third wall, and extending transversely between said pair of intersecting walls, and has adjacent its opposite end a second portion extending transversely of said first portion thereof and into engagement with said first pair of walls adjacent the open end of said housing, whereby said wiring chamber is closed at one end by said third wall and at its opposite end by said second portion of said first cover element.

9. An enclosure as defined in claim 8, wherein said detent means is formed on said first portion of said first cover element.

10. An enclosure as defined in claim 9 wherein said first portion of said first cover element has therein adjacent said detent means a wire inlet/outlet opening.

11. An enclosure as defined in claim 10, wherein said chamber is generally triangular in cross section.

12. An enclosure as defined in claim 11, wherein
    said first portion of said first cover element is generally rectangular in configuration, and said second portion thereof is generally triangular in configuration.

* * * * *